Jan. 17, 1950  E. M. PATTERSON ET AL  2,494,777
INJECTION MOLD WITH SPRUE SEVERING MEANS
Filed Aug. 21, 1946  4 Sheets-Sheet 1
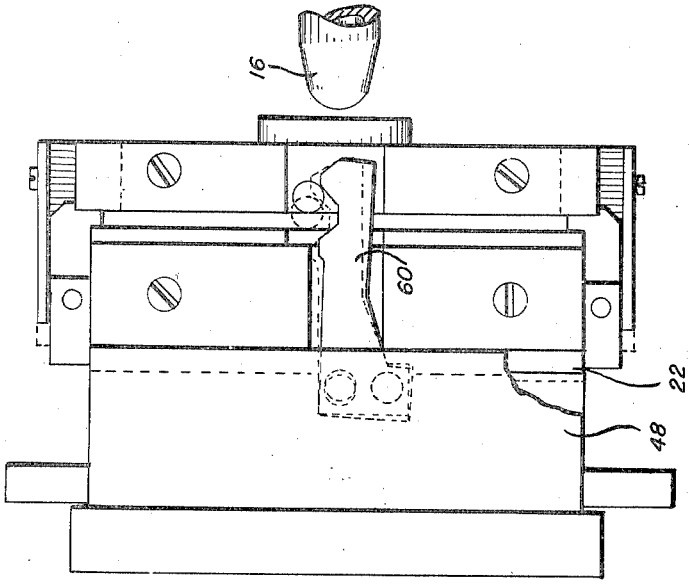
FIG. 2
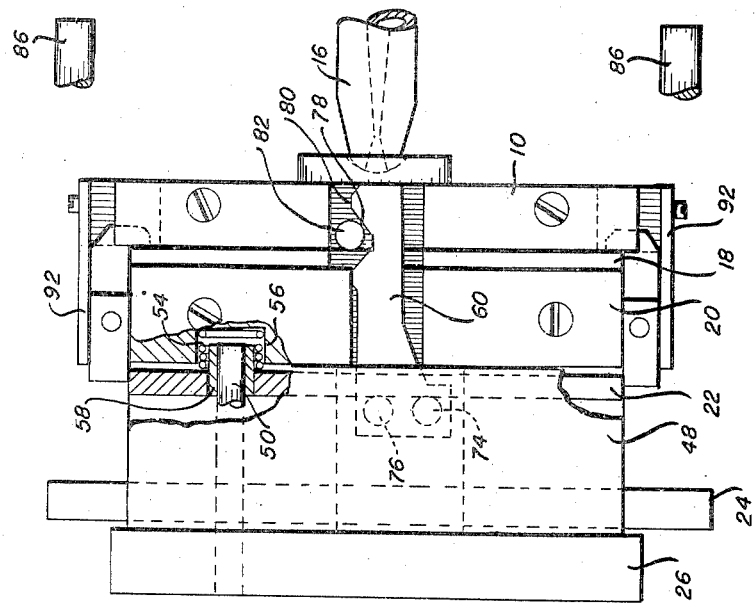
FIG. 1
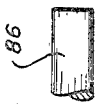
INVENTORS
EVERETT M. PATTERSON
FRANCIS R. McALOON
BY
C. Hercus Just
ATTY.

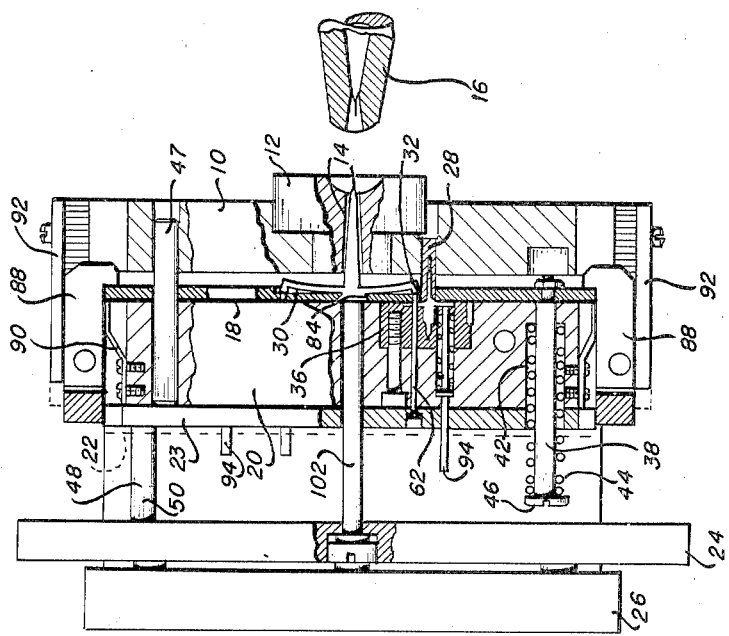
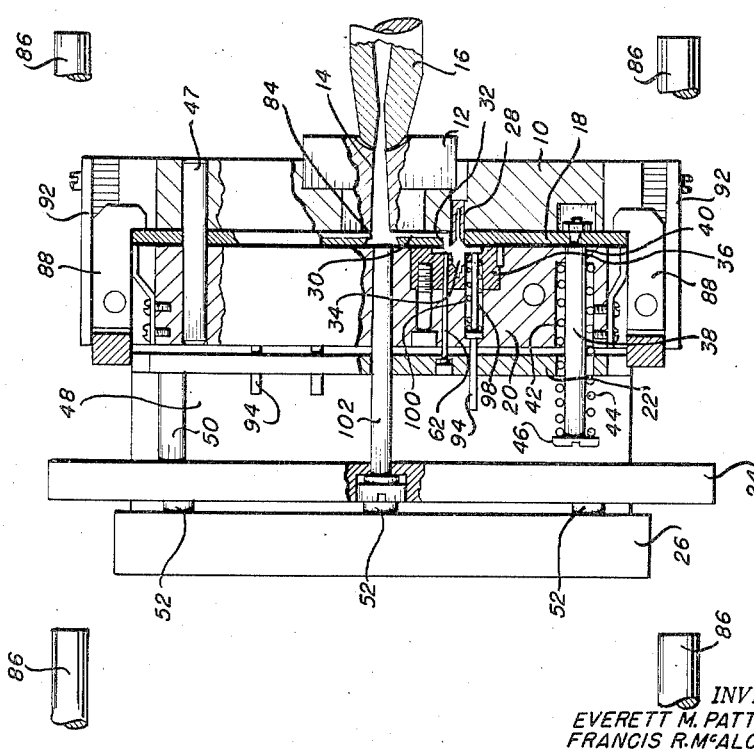

Jan. 17, 1950    E. M. PATTERSON ET AL    2,494,777
INJECTION MOLD WITH SPRUE SEVERING MEANS
Filed Aug. 21, 1946    4 Sheets-Sheet 3
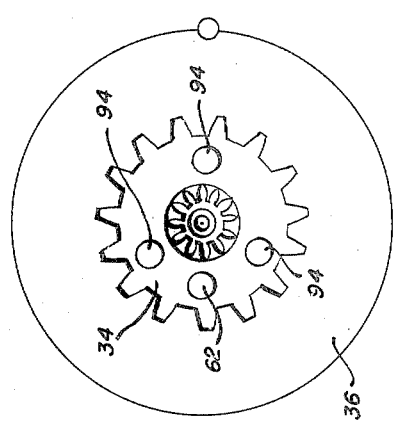
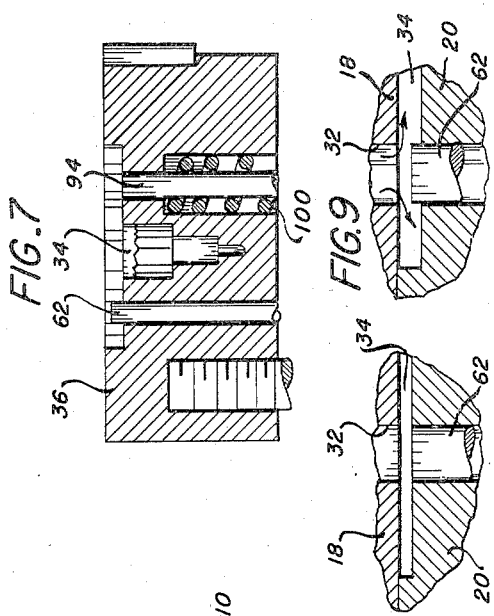
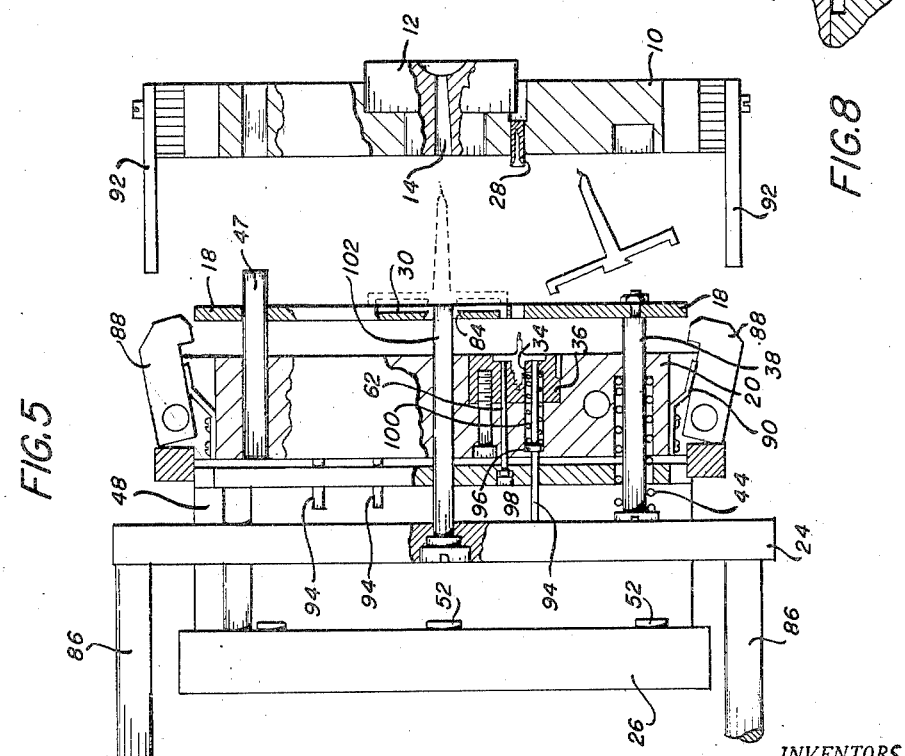
INVENTORS
EVERETT M. PATTERSON
FRANCIS R. McALOON
BY
ATTY.

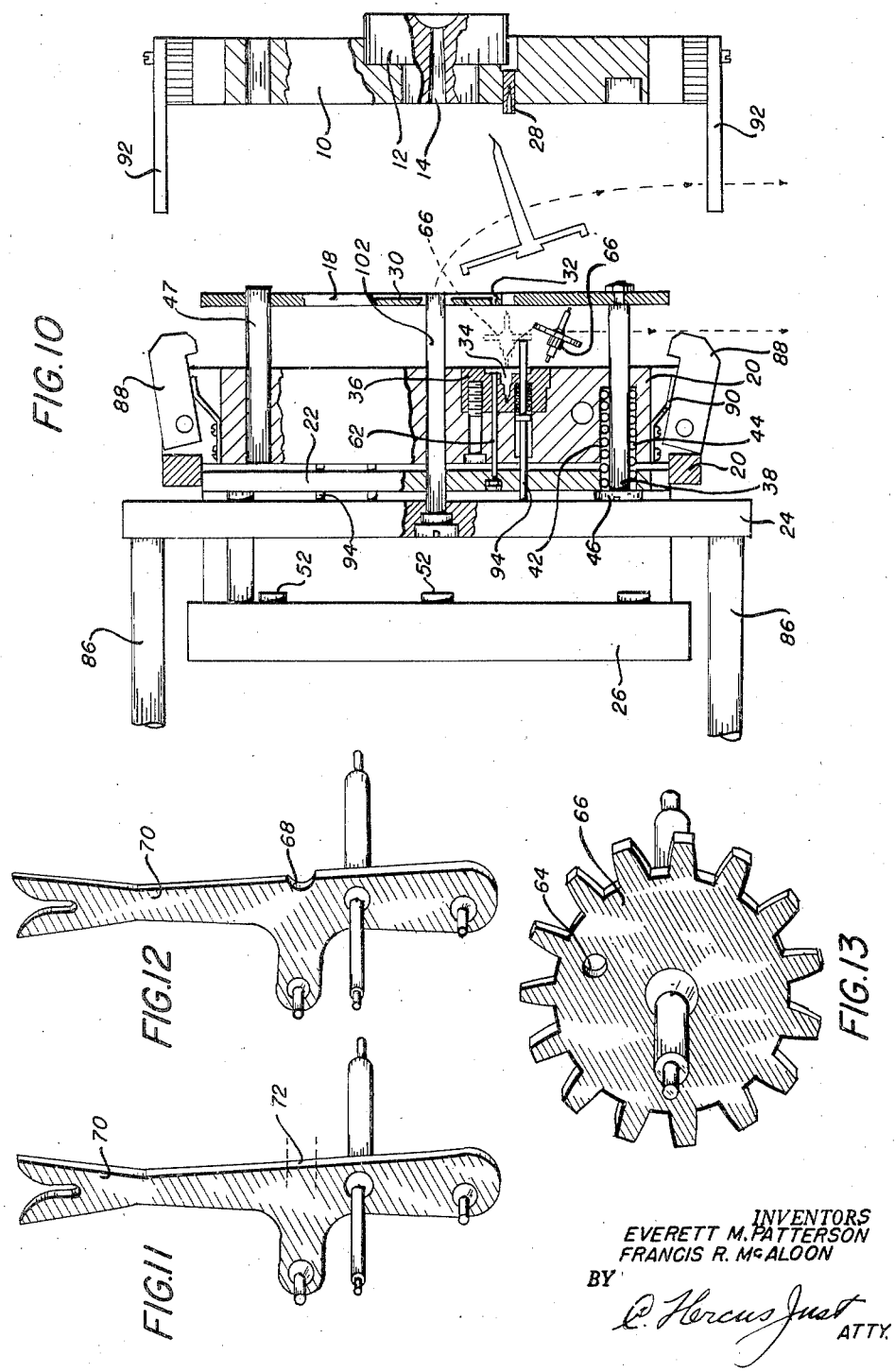

Patented Jan. 17, 1950

2,494,777

UNITED STATES PATENT OFFICE 2,494,777

INJECTION MOLD WITH SPRUE SEVERING MEANS

Everett M. Patterson, Watertown, and Francis R. McAloon, Waterbury, Conn., assignors to The United States Time Corporation, Waterbury, Conn., a corporation of Connecticut Application August 21, 1946, Serial No. 691,970

2 Claims. (Cl. 18—42)

This invention relates to improvements in an injection molding die. More particularly, this invention was developed for purposes of producing molded products in finished condition by an injection process and without requiring the separation of molded gates and products after the same have been removed from the mold cavity as is now required by present practices with conventional molds.

Pressure molding of objects formed from thermo-setting synthetic resinous materials now produces substantially finished articles having little or no flash. Such flash as is produced is removed from the molded articles by tumbling and other suitable means. However, the formation of substantially finished molded objects by an injection molding process has heretofore been impossible with existing machines and processes since injection molding requires gating into the mold cavity with the result that the attached gate and object are removed from the mold as a unit, and subsequent separation of the gate from the object is required. Said separation of the molded gate and object adds expense to the finished product in that a separate step is required to produce the finished object. Furthermore, said separation is frequently done by processes which produce a marred portion on or a superfluous projection extending from the surface of the object where the gate was separated therefrom. If such marred or disfigured surface portion is unacceptable in the finished product, a still further finishing operation is necessary for purposes of obliterating or removing such portion.

It is therefore an object of the present invention to produce a molding die construction capable of achieving an injection molding process by which completely finished molded objects and articles may be automatically produced as a result of the molding operation and without requiring subsequent severance or separation of molded gates and runners from the molded articles.

It is another object of the invention to provide a molding die construction within which means are provided for automatically separating molded gates and/or runners from molded objects prior to the removal of said molded objects from at least one part of a multi-part mold which contains and defines the mold cavity; whereby when the molded objects are ejected from the mold, they are in either substantially or completely finished condition.

It is a still further object of the invention to provide a molding die construction having one or more cavities therein for producing by an injection molding process molded objects, said die construction containing channels and openings known as runners and gates and said gates entering the mold cavities of the die through surfaces of said cavities which will form non-critical surfaces on the molded objects as distinguished from critical surfaces; whereby when the molded gates and runners are separated from the molded objects, the critical surfaces especially will have the usual required finished molded surface normally produced by a molding die, and the separation of the molded gate from a non-critical surface portion of a molded object will not affect any critical surface of the molded object as distinguished from present practices wherein molded gates are generally connected to molded objects at portions of the surface of the object which are critical.

The details of these objects and the invention, as well as other objects thereof, are set forth in the following specification and illustrated in the accompanying drawings forming a part thereof.

In the drawings, a molding die construction is illustrated in an exemplary manner without showing many of the details of the injection molding machine which operates the various parts of the mold per se. It is not believed necessary to burden the illustration with such details since the machine with which the molding die of this invention is used is of substantially standard construction in many types of machines now in use.

In the preferred embodiment of the invention, the molding die comprising the invention is mounted within an injection molding machine having mold-operating members movable in a substantially horizontal direction. However, it is readily conceivable that substantially all aspects of the molding die and process comprising the present invention are useful in molding machines and die constructions including operating members movable in a substantially vertical direction.

In the drawings:

Fig. 1 is an external side elevation of the molding die construction comprising the present invention and parts of the molding machine in which said mold is operable, said view being partly sectioned and broken away to better illustrate details of the invention. In this figure, the die is shown in contact with the injection nozzle, and the die is in a position to receive a charge of molten material.

Fig. 2 is an external view similar to Fig. 1 but shows the die in the next stage of its operation following the injection of the charge and in which position separation of the molded gates from the molded objects takes place.

Fig. 3 is very similar to Fig. 1 but shows most of the die in section to illustrate details thereof.

Fig. 4 is a view corresponding to Fig. 2 but is shown partly in section to illustrate details of the die and particularly the separation of the molded gates from the molded objects.

Fig. 5 is a view similar to Figs. 3 and 4 and illustrates a more advanced stage of the separation of the various parts of the die construction, said view showing the ejection and removal of the molded assembly of gates and runners from the die and the ejection plunger about to commence to remove the molded objects from the mold cavity.

Fig. 6 is an enlarged plan view of a molding die insert containing the cavity which forms one of the finished objects.

Fig. 7 is a sectional side elevation of Fig. 6 illustrating details of the gate-shearing member and ejection plunger.

Fig. 8 is a fragmentary side elevation illustrating the relative positions of the gate and gate-shearing member in relation to a mold cavity.

Fig. 9 is a view similar to Fig. 8 but illustrating another embodiment of said relationship.

Fig. 10 is a view similar to Fig. 5 but illustrating a still more advanced stage of the separation of the various parts of the molding die construction, in this view the ejection plunger for the molded objects having functioned to remove said objects from each mold cavity.

Figs. 11, 12, and 13 respectively illustrate perspective views of molded objects having critical and non-critical surfaces capable of being formed by the process and molding die comprising this invention.

This invention is particularly adaptable to the molding by injection means of synthetic resinous material to form finished objects, but it is readily conceivable that the principles of at least the process illustrated and described herein are useful for molding objects from other kinds of fusible material such as various types of readily fusible metal.

The molding die construction illustrated and described herein contains only a single mold cavity, but such illustration is for purposes of simplicity and clarity only, it being understood that the principles of the invention are applicable to multi-cavity as well as single cavity dies.

One of the fundamental aspects of the invention comprises separating, prior to their removal from the molding die, the molded runner and gate from each molded object either at the juncture thereof or by removing from the object part thereof which is immediately attached to said molded gate. Such separation takes place preferably immediately after the fusible material has set within the mold cavity, the gate openings, and the runner channels, as well as the sprue opening.

As used hereinafter and in the appended claims, the term "gate," when used as a verb, refers to forming an opening through a wall of the mold cavity and through which molten material enters said cavity from the runner channel leading to the gate; the term "gate," when used as a noun, refers to the terminal end of the runner channel which enters the mold cavity of the molding die; the term "molded gate" refers to the set molding material disposed in the gate of the molding die following each injection of molten material; the term "runner channel" refers to the channel which connects the gate and the sprue opening in the plates of the molding die; the term "set" refers to the hardening of the material from the molten state to that condition wherein it will substantially retain its molded shape without external support; and the term "runner" is the set molding material which extends from the gate to the sprue opening.

The process and molding die construction comprising the present invention lend themselves particularly well to the molding of various objects having critical and non-critical portions. This is particularly applicable to functional and structural objects which have as their principal purpose the transmission of motion, force, energy, and the like, as distinguished from ornamental objects. However, the invention is also equally applicable to the formation of ornamental objects, especially if at least one portion of the surfaces of said objects is not readily seen in customary use thereof, whereby a cavity, opening, or sheared surface formed as a result of separation of the gate from the object will not mar or detract from the appearance of the molded ornamental object.

More particularly, functional and structural objects generally have certain members, surfaces, or portions in regard to which either the surface finish or the position thereof with respect to the remainder of the object is critical from the standpoint of accuracy and/or efficient performance of a required function such as the transmission of motion, force, energy, and the like. A specific embodiment of such an object is a gear wheel or pinion wherein the surfaces of the teeth are critical both from the standpoint of both finish and dimension. Another embodiment is a lever having surfaces or members thereon which engage other cooperating members for purposes of transmitting motion, force, and the like. Without limitation thereto, this invention is especially applicable to the inexpensive and rapid production of finished components and sub-assemblies to be used in timepieces and other types of precision instruments utilizing relatively small components made with exactness. Said components are principally functional and structural objects having critical surfaces of the nature referred to above as well as non-critical surfaces which do not affect the functioning of the objects.

As used hereinafter, therefore, the term "critical surface" or "critical portion" refers to those surfaces or portions on a molded object which so cooperate with other coengageable objects or members that said portions and objects must have finished molded surfaces into which it is highly undesirable to gate the molten material during the molding process. Similarly, the term "non-critical surface" or "non-critical portion" refers to those surfaces and portions which do not cooperate with or coengage other objects or members, whereby gating into such surfaces and portions will not produce undesirable results when using the molded object.

Referring to the drawings, the molding die construction comprises front cavity plate or first die member 10 having a suitable opening to receive the sprue bushing 12, said bushing containing a sprue opening 14 terminating at one end in a suitable recess engageable by nozzle 16 of a conventional injection molding press.

Adjacent member 10 is another die member 18 which shall be designated a second die member and is in the nature of a floating plate. A further die member 20, designed a third die member, is also provided for cooperation with die member 18.

Mounted in juxtaposition to die member 20 is a shear pin-retaining plate 22. The die construction also includes a stripper or ejector plate 24 and a bottom plate 26. The entire construction comprising the die assembly includes the various members and elements referred to above. Said die assembly is placed within a conventional injection molding press and preferably one in which the injection nozzle as well as the ram or plunger operating the bottom plate move in a horizontal direction, although it is to be understood that the die construction may as readily be employed in a press in which said nozzle and ram move in a vertical direction. For purposes of illustration, the drawings show the die construction mounted for operation in a horizontal direction.

The mold cavity in the present illustration has been shaped to mold a composite gear or wheel, pinion, and staff. For convenience in molding said composite object, first die member 10 is formed with a die insert 28 containing part of the molding cavity. Second die member 18 contains a runner channel 30 which connects the sprue opening 14 with a gate 32 formed in second die member 18. Thus, it will be seen that first and second die members 10 and 18 are contracted to define the runner channel, and gate 32 enters one wall of the main portion of mold cavity 34. Said mold cavity 34 is preferably formed in another die insert 36 carried by third die member 20.

The die construction is mounted in the machine in such a manner that first die member 10 is securely anchored to the press, and second and third die members 18 and 20 move relative to first die member 10. Second die member 18 is secured to a plurality of guide rods 38, only one of which is shown in the drawing, said guide rods being movable through bearing openings 40 provided in third die member 20. Each bearing opening connects with an enlarged opening 42 which receives a helical coiled spring 44, one end of the spring engaging the bottom of opening 42 and the other end engaging a head 46 on each guide rod 38. Thus, springs 44 on the guide rods 38 will act upon said rods to normally retain second die member 18 in abutting relationship with third die member 20. All three die members 10, 18, and 20 are principally aligned by a plurality of guide pins 47, only one of which is shown, fixed to the third die member 20 and slidably received within suitable bearing guide openings in the other two die members.

As stated hereinabove, bottom plate 26 is connected in any suitable manner directly to the die-operating ram of the press, said ram not being illustrated. Said bottom plate 26 is fixedly connected to said third die member 20 by a pair of opposed spacer blocks 48, both of which are shown in the drawings, but it will be understood that said blocks are preferably disposed on opposite sides of the die assembly to afford maximum rigidity. Also extending between said bottom plate and third die member are a plurality of guide rods 50, only one of which is shown in the drawings. Said rods 50 are preferably disposed in spaced relationship adjacent opposite sides of the die assembly in order to afford proper guiding to the ejector plate 24 which is slidably mounted on said guide rods 50. Thus, ejector plate 24 moves relative to bottom plate 26 and the third die member 20, but movement of said ejector plate in the direction of bottom plate 26 is arrested by engagement of said ejector plate with a plurality of stops 52 carried by said bottom plate 26.

Shear pin-retaining plate 22 is normally held slightly spaced from the third die member 20 as shown in Figs. 1, 3, 5, and 10, said spacing being maintained by a plurality of helical springs 54, one of which is shown in Fig. 1. Said springs are respectively mounted in recesses 56 formed in the third die member 20. Proper guidance of shear pin-retaining plate 22 is afforded by bearing sleeves 58 fixed to said plate and respectively slidably mounted on guide rods 50.

A pair of actuating arms 60 is respectively mounted on two opposite sides of said die assembly for purposes of moving shear pin-retaining plate 22 toward said third die member 20. Plate 22 carries one gate shear pin 62 for each mold cavity in the third die member 20, one end of each shear pin 62 being disposed either adjacent or slightly within each mold cavity 34 and in a position opposite to the gate 32 of each cavity.

The spacing of said end of each shear pin 62 in relation to the gate of each mold cavity is critical in that the flow of molten material into the mold cavity is controlled by said spacing. Referring to Figs. 8 and 9, when an object is to be molded by gating into a relatively thin section thereof, the end of said shear pin may be flush with the surface of the mold cavity through which said pin will be projected as shown in Fig. 8. However, where the object is to be molded by gating into a reasonably thick cross section, as shown in Fig. 9, the end of shear pin 62 is normally disposed within the mold cavity 34 a sufficient distance to properly control the flow of molten material in all directions into the mold cavity and for the following more important reason.

A relatively small space between the end of pin 62 and the end of gate 32 is mainly provided so that movement of said pins to and through said gates, after the molded object has set within the mold cavity, will necessitate only a relatively short shearing motion for purposes of separating the molded gate from the molded object preferably prior to the separation of the second and third die members 18 and 20. Said separation is effected chiefly by a shearing produced by gate shear pin 62, such shearing resulting from the fact that the cross section of each shear pin 62 conforms closely to the cross section of each gate opening 32. Thus, the gate openings 32 in second die member 18 and the shear pins 62 constitute pairs of punching dies.

As stated hereinabove, both utilitarian and ornamental objects may be produced by the die construction comprising this invention, and the separation of the molded gates and molded objects referred to above is performed automatically by the die construction. In molding utilitarian objects especially which have both critical and non-critical surfaces of the nature described above, it is preferable and, in many instances, essential that the gate 32 enters the mold cavity 34 through a surface of the cavity which will form a so-called non-critical surface on the molded object. That is, said surface should not come into engagement with a critical surface on another member or object with which said first object is to co-act for purposes of transmitting force, motion, and the like.

Specifically, when molding gear wheels, for example, critical surfaces of the mold cavity would be any which form the surface of the gear teeth of the molded object. Thus said surfaces of the mold should not have the gates enter the cavity therethrough. However, as illustrated in Fig. 13 especially, an opening 64 is shown which has been formed as a result of the shear pin 62 separating the molded gate from the molded gear wheel. It will be observed said opening 64 is disposed in a non-critical portion of the gear wheel 66 illustrated in said figure.

The illustration in Fig. 13 represents only one manner in which the separation of the molded gate and the molded object may be effected. In principle, such separation may be made by removing from the molded object that portion thereof which is immediately connected to the molded gate. The removal of such portion is made in such a manner as to make a recess or cavity 68 in a molded object such as lever 70 shown in Fig. 12. The contour of said recess 68 is substantially semi-circular in cross section to render more simple the formation of the recess.

Rather than remove a portion of the molded object relative to effecting separation of said object and molded gate, such separation may be made by shearing along a portion 72, defined by dotted lines in Fig. 11, of the normal finished surface of a molded object such as lever 70 shown in said figure. In this embodiment, part of the surface of said finished molded object will be formed by actually being sheared from a molded gate after said object has been molded and set within the mold cavity but prior to its removal therefrom. In this embodiment, rather than use a shear pin which is circular in cross section such as pin 62, a pin is used having one side shaped in cross section to form a portion of the finished object, it being understood that the gate 32 has a shape complementary to that of the shear pin.

Separation of a molded gate from a molded object, as stated above, is effected by gate shear pins 62 which are rigidly connected to retaining plate 22, actuation of plate 22 being accomplished by actuating arms 60. Said arms 60 are respectively pivotally mounted on pins 74 which are fixed to the inner surfaces of spacer blocks 48. Each arm 60 carries a pin 76 which extends inward of the die assembly from spacer block 48 and engages one edge of that surface of retaining plate 22 which is remote from the third die member 20.

The end of each arm 60 remote from its pivoted end is provided with a notch 78 which forms a cam projection 80 that is engageable with a pin 82 fixedly carried by the first die member 10. The operation of said actuating arms 60 is as follows:

At the commencement of the molding operation, the three die members 10, 18, and 20 are disposed in the positions thereof illustrated in Figs. 1 and 3. A charge of molten material is injected from nozzle 16 through sprue opening 14, runner channels 30, and gates 32 into mold cavities 34, it being understood that while the die assembly illustrated in the drawings shows only a single mold cavity 34, the die members actually contain a plurality of such mold cavities. Following a few seconds of setting time, nozzle 16 is withdrawn in one direction and bottom plate 26, which is rigidly secured to the third die member 20, is withdrawn in the opposite direction while carrying the second die member 18 therewith juxtaposed to and in firm engagement with said third die member 20.

During the commencement of such movement of the third die member 20, actuating arms 60 are moved downward at one end to the full line position shown in Fig. 2 from the dotted line position shown therein, due to cam projections 80 engaging fixed pins 82. This actuation of arms 60, through the medium of pins 76, moves retaining plate 22 from the position shown in Fig. 1 to that shown in Fig. 2, thus causing shear pins 62 to move into the gates 32 and separate the molded gates from the molded objects in the various mold cavities 34 in the manner described above.

Such separation is possible due to the fact that the initial separation of first and second die members 10 and 18 leaves the runner channels 30 open at one side, whereby the gate end of the molded runners and gates may be moved away from second die member 18. However, a dovetailed recess 84 is provided in second die member 18 for purposes of temporarily retaining the molded sprue, runners, and gates attached to second die member 18 until the sprue opening 14 in first die member 10 has been moved sufficiently from the molded sprue that there will be no possibility of lodgement of the molded sprue and attached runners therein.

Continued movement of the partial die assembly comprising second and third die members 18 and 20, as well as bottom plate 26 away from first die member 10, will permit springs 54 to move retaining plate 22 to its normally spaced position relative to the third die member 20 shown in Fig. 1 after each cam projection 80 has moved past pins 82.

Fixedly positioned on the press in predetermined relationship to the first die member 10 are a plurality of suitable knock-out rods 86. In the drawings, these have merely been fragmentarily illustrated to simplify the illustration, and they may be secured to the press in any suitable manner.

Ejector plate 24 engages said knock-out rods when the second and third mold members 18 and 20 and bottom plate 26 have been retracted sufficiently to permit such engagement as shown in Fig. 5. By this time, considerable space is provided between the first die member 10 and the remainder of the die construction as readily shown in Fig. 5. During the time second and third die members 18 and 20 are moving to that position wherein ejector plate 24 engages knock-out rods 86, separation of said second and third die members is positively prevented by a plurality of suitable latches 88 which are pivotally connected to the third die member 20 and are normally biased outward at their free ends by suitable means such as leaf springs 90. Latches 88 are retained in latching position relative to the second die member 18 by pawls 92 fixedly carried by the first die member 10. As soon as the free ends of latches 88 have passed beyond the free ends of pawls 92, the latches are automatically disengaged from the second die member 18.

Upon engagement of ejector plate 24 with knock-out rods 86, continued movement of the third die member 20 will bring the heads 46 of guide rods 38 into abutting engagement with ejector plate 24, thus arresting the movement of second die member 18, although third die member 20 continues to move away from said second die member to cause opening of the mold cavity 34.

Each die insert 36 and the third die member 20 slidably support a plurality of stripper pins 94 which are respectively provided with an annular flange 96. The third die member 20 and each die insert 36 contain a cylindrical cavity 98 which receives a helical spring 100 surrounding each stripper pin 94, each said spring engaging at its opposite ends one face of flange 96 and one end of cavity 98 for purposes of normally retaining the stripper pins 94 in their normally retracted position such as illustrated in Figs. 3, 4, and 5, and in which position the inner ends of stripper pins 94 are preferably precisely flush with the surface of the mold cavity through which they project when ejecting a molded object therefrom.

After ejector plate 24 engages knock-out rods 86, the first part of the continued movement of the third die member 20 and bottom plate 26 relative to the ejector plate 24 causes sprue puller rod 102, which is rigidly fixed to ejector plate 24, to be moved relative to second die member 18 as shown in Fig. 5. In so moving, the puller rod 102 forcibly moves the flared, molded end of the molded sprue from engagement with the dovetailed recess 84 as also illustrated in Fig. 5. The molded assembly of sprue runner and gates is thus automatically ejected from the die assembly and will fall from the dotted line position thereof shown in Fig. 5 to a location beneath the press.

Immediately after the removal of the aforementioned molded sprue assembly, continued movement of third die member 20 relative to ejector plate 24 causes engagement of the outer ends of stripper pins 94 with said ejector plate, and subsequent movement of the third die member 20 will cause the other ends of all of said ejector pins to engage the molded objects within the various mold cavities and cause them to be automatically ejected from the mold through the space provided between the second and third die members as is clearly shown in Fig. 10. For different mold cavities, the stripper pins 94 may have various lengths, but they should all be of such length that they will engage ejector plate 24 at the proper time interval to permit simultaneous ejection of all molded objects when the second and third mold members are spaced apart the greatest distance during the operation of the die construction.

To prevent cocking of the various molded objects while being removed from the various mold cavities, a plurality of preferably evenly or diametrically spaced stripper pins are provided as illustrated in plan view in Fig. 6.

Following the ejection of the molded sprues, runners, and gates and the molded objects, the ram which actuates die members 18 and 20 and bottom plate 26 reverses its direction of movement and moves said bottom plate and third die member 20 toward first die member 10. During the course of such movement, stripper pins 94 are retracted to their normal position within the third die member and die inserts, second die member 18 is brought into closed relationship with the third die member 20 due to the action of springs 44, latches 88 are brought into latching engagement with said second die member 18 by coengagement of the latches with pawls 92, and, finally, the second and third die members are brought into closed relationship with the first die member 10 as illustrated in Fig. 1.

While the invention has been illustrated and described in its several embodiments and has included certain details, it should be understood that the invention is not to be limited to the precise details herein illustrated and described since the same may be carried out in other ways, falling within the scope of the invention as claimed.

What we claim is:

1. In a molding die construction, the combination of three die members, two of said die members being formed to define a mold cavity for molding an article and one of said two and the third die member being formed to define a gate entering said mold cavity, means operable to hold said two die members together while said third die member is movable away therefrom, a severing member disposed with a portion movable into engagement with the juncture of said gate and cavity to sever a molded gate from a molded article, means comprising a cam and cam actuating means interconnected one with said severing member and the other with said third die member and operable during movement of the latter away from said two die members to actuate said severing means while the latter are held together, whereby the molded gate is severed and moved by said severing member away from the molded article while the latter is retained within the mold cavity, and means operable to subsequently separate said other two die members to permit removal of the molded article from the mold cavity.

2. In a molding die construction, the combination of three die members, two of said die members being formed to define a mold cavity for molding an article and one of said two and the third die member being formed to define a gate entering said mold cavity, latch means operable to hold said two die members together while said third die member is movable away therefrom, means operable by said third die member to control the operation of said latch means, a severing member disposed with a portion movable into engagement with the juncture of said gate and cavity to sever a molded gate from a molded article, means engageable with said severing member and operable by said third die member during its movement away from said two die members to actuate said severing means while the latter die members are held together, whereby the molded gate is severed and moved by said severing member away from the molded article while the latter is retained within the mold cavity, said third die member then being in a position to release the latches holding said two die members together, and means operable to then separate said other two die members to permit removal of the molded article from the mold cavity.

EVERETT M. PATTERSON.
FRANCIS R. McALOON.

REFERENCES CITED

The following references are of record in the file of this patent:

UNITED STATES PATENTS

| Number | Name | Date |
| --- | --- | --- |
| 1,322,502 | Gullborg | Nov. 18, 1919 |
| 2,298,716 | Moreland | Oct. 13, 1942 |
| 2,330,369 | Marsh | Sept. 28, 1943 |
| 2,372,177 | Conner | Mar. 27, 1945 |
| 2,404,671 | Vinal | July 23, 1946 |
| 2,415,961 | Nast | Feb. 18, 1947 |

OTHER REFERENCES

Mold Designed to Trim Sprues—W. C. Renevick from Modern Plastics, March 1942. (Copy in Div. 15).

Modern Plastics Improved Design for Injection Molds, May 1941. (Copy in Div. 15, page 77.)

Modern Plastics—Injection-compression Molding of Acrylic Feeder Heads, Sept. 1945. (Copy in Div. 15, pages 148–150.)